(12) United States Patent
Ahmed

(10) Patent No.: US 10,140,092 B2
(45) Date of Patent: Nov. 27, 2018

(54) CLOSEPATH FAST INCREMENTED SUM IN A THREE-PATH FUSED MULTIPLY-ADD DESIGN

(71) Applicant: Samsung Electronics Co., Ltd., Suwon-si, Gyeonggi-do (KR)

(72) Inventor: Ashraf Ahmed, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/430,438

(22) Filed: Feb. 10, 2017

(65) Prior Publication Data

US 2018/0129474 A1     May 10, 2018

Related U.S. Application Data

(60) Provisional application No. 62/418,167, filed on Nov. 4, 2016.

(51) Int. Cl.

| | |
|---|---|
| G06F 7/38 | (2006.01) |
| G06F 7/485 | (2006.01) |
| G06F 7/487 | (2006.01) |
| G06F 7/483 | (2006.01) |
| G06F 7/544 | (2006.01) |

(52) U.S. Cl.
CPC .............. G06F 7/485 (2013.01); G06F 7/483 (2013.01); G06F 7/4876 (2013.01); G06F 7/5443 (2013.01)

(58) Field of Classification Search
CPC .............................. G06F 7/485; G06F 7/4876

USPC ................................................. 708/495–514
See application file for complete search history.

(56) References Cited

U.S. PATENT DOCUMENTS

| | | | | |
|---|---|---|---|---|
| 5,548,544 | A * | 8/1996 | Matheny | G06F 7/483 708/497 |
| 5,796,644 | A * | 8/1998 | Jiang | G06F 7/485 708/205 |
| 6,205,461 | B1 * | 3/2001 | Mansingh | G06F 7/485 708/211 |
| 6,405,231 | B1 * | 6/2002 | Nowka | G06F 7/49957 708/497 |
| 6,615,228 | B1 * | 9/2003 | Colon-Bonet | G06F 7/5443 708/497 |

(Continued)

*Primary Examiner* — Tan V. Mai
(74) *Attorney, Agent, or Firm* — Renaissance IP Law Group LLP

(57) ABSTRACT

According to one general aspect, an apparatus may include a floating-point multiply-accumulate unit configured to generate a floating point result by either adding or subtracting three floating point operands: an addend, a product carry, and a product sum. The floating-point multiply-accumulate unit may include a close path adder. The close path adder may include an unincremented mantissa addition circuit configured to compute an unincremented mantissa result based upon the three floating point operands. The close path adder may also include an incremented mantissa addition circuit configured to, at least partially in parallel with the mantissa addition circuit, produce an incremented mantissa result. The close path adder may further include a selection circuit configured to produce a close path result by selecting between the unincremented mantissa result and the incremented mantissa result.

20 Claims, 7 Drawing Sheets

(56) References Cited

U.S. PATENT DOCUMENTS

| | | |
|---|---|---|
| 6,701,427 B1 * | 3/2004 | Hinds ................. G06F 7/49905 708/506 |
| 7,080,111 B2 | 7/2006 | Pangal et al. |
| 7,337,202 B2 | 2/2008 | Datta et al. |
| 7,421,465 B1 * | 9/2008 | Rarick ................... G06F 7/483 708/490 |
| 8,037,118 B2 | 10/2011 | Quinnell et al. |
| 2016/0004665 A1 | 1/2016 | Elmer |

* cited by examiner

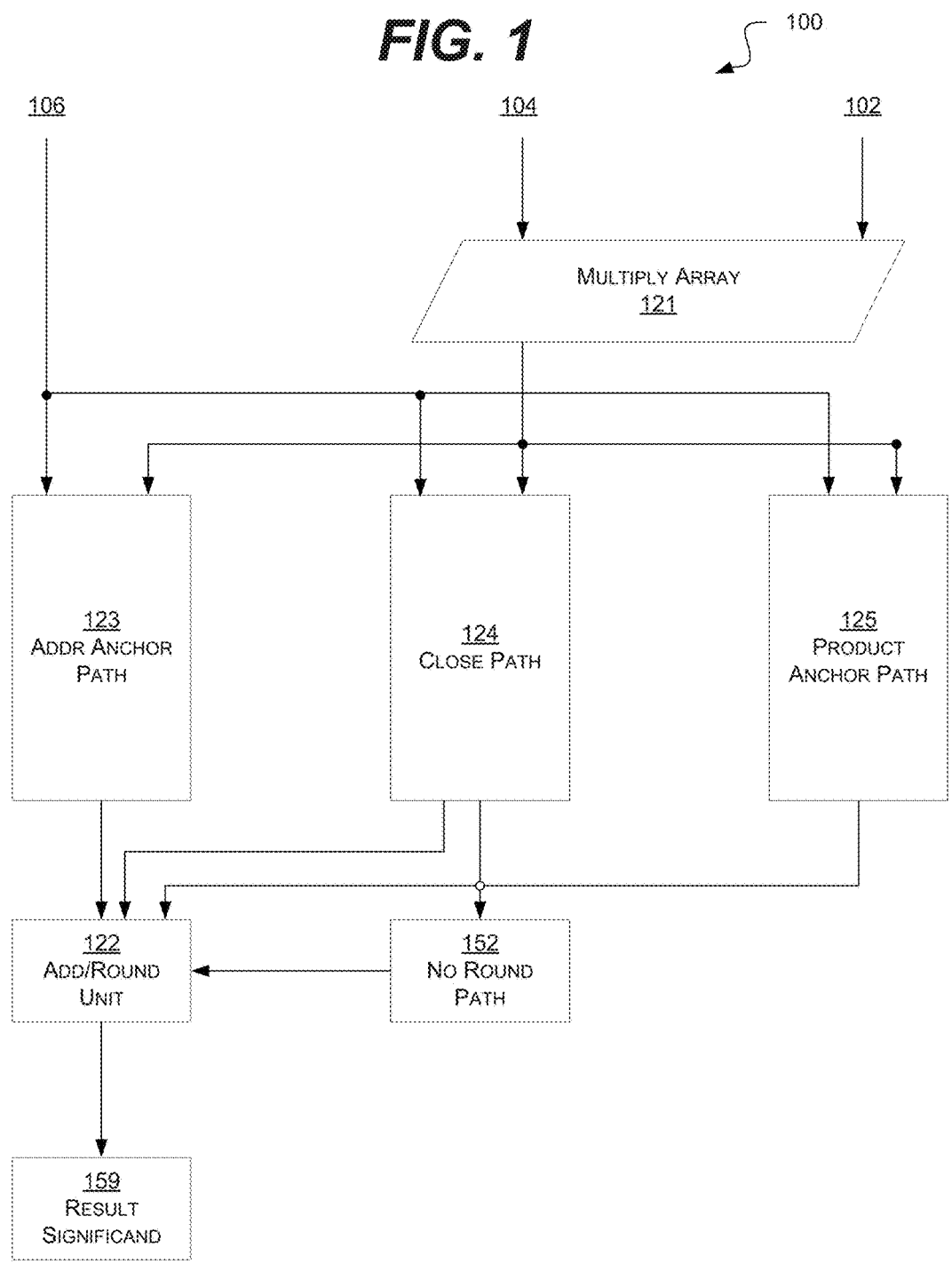

CLOSEPATH FAST INCREMENTED SUM IN A THREE-PATH FUSED MULTIPLY-ADD DESIGN

CROSS-REFERENCE TO RELATED APPLICATION

This application claims priority under 35 U.S.C. § 119 to Provisional Patent Application Ser. No. 62/418,167, entitled "Closepath Fast Incremented Sum in a Three-Path Fused Multiply-Add Design" filed on Nov. 4, 2016. The subject matter of this earlier filed application is hereby incorporated by reference

TECHNICAL FIELD

This description relates to the electrical computation of mathematical operations, and more specifically increasing the speed of the close path of a floating-point multiply-accumulate unit.

BACKGROUND

In computing, a floating point number generally includes a technique for representing an approximation of a real number in a way that can support a wide range of values. These numbers are, in general, represented approximately to a fixed number of significant digits and scaled using an exponent. The term "floating point" refers to the fact that a number's radix point (e.g., decimal point, or, more commonly in computers, binary point) can "float"; that is, it can be placed anywhere relative to the significant digits of the number. This position is indicated as the exponent component in the internal representation, and floating point can thus be thought of as a computer realization of scientific notation (e.g., $1.234 \times 10^4$ versus 1,234).

The Institute of Electrical and Electronics Engineers (IEEE) Standard for Floating-Point Arithmetic (IEEE 754) is a technical standard for floating-point computation established in 1985 by the IEEE. Many hardware floating point units or circuits are substantially compliant with the IEEE 754 standard. Herein, the term "IEEE 754" refers to standards substantially complaint with the *IEEE Standard for Floating-Point Arithmetic*, IEEE Std. 754-2008 (29 Aug. 2008) or standards derived from or preceding that standard.

The IEEE 754 standard allows for various degrees of precision. The two more common levels of precision include a 32-bit (single) and 64-bit (double) precision. The 32-bit version of a floating point number includes a 1-bit sign bit (that indicates whether the number is positive or negative), an 8-bit exponent portion (that indicates the power of 2 where the radix point is located) and a 23-bits fraction, significand, or mantissa portion (that indicates the real number that is to be multiplied by 2 raised to the power of the exponent portion). The 64-bit version includes a 1-bit sign indicator, 11-bit exponent portion, and a 52-bit fraction portion. It is understood that the above are merely a few illustrative examples to which the disclosed subject matter is not limited.

SUMMARY

According to one general aspect, an apparatus may include a floating-point multiply-accumulate unit configured to generate a floating point result by either adding or subtracting three floating point operands: an addend, a product carry, and a product sum. The floating-point multiply-accumulate unit may include a close path adder. The close path adder may include an unincremented mantissa addition circuit configured to compute an unincremented mantissa result based upon the three floating point operands. The close path adder may also include an incremented mantissa addition circuit configured to, at least partially in parallel with the mantissa addition circuit, produce an incremented mantissa result. The close path adder may further include a selection circuit configured to produce a close path result by selecting between the unincremented mantissa result and the incremented mantissa result.

According to another general aspect, a system may include a memory and a processor. The memory may be configured to store three floating point operands. The processor may include a floating-point multiply-accumulate unit configured to generate a floating point result by either adding or subtracting three floating point operands: an addend, a product carry, and a product sum. The floating-point multiply-accumulate unit may include a close path adder. The close path adder may include an unincremented mantissa addition circuit configured to compute an unincremented mantissa result based upon the three floating point operands. The close path adder may also include an incremented mantissa addition circuit configured to, at least partially in parallel with the mantissa addition circuit, produce an incremented mantissa result. The close path adder may further include a selection circuit configured to produce a close path result by selecting between the unincremented mantissa result and the incremented mantissa result.

According to another general aspect, a method may include receiving three floating point operands: an addend, a product carry, and a product sum. The method may include computing, via an unincremented mantissa addition circuit, an unincremented mantissa result based upon the three floating point operands. The method may include computing, by an incremented mantissa addition circuit and at least partially in parallel with the mantissa addition circuit, an incremented mantissa result. The method may include producing a close path result by selecting between the unincremented mantissa result and the incremented mantissa result.

The details of one or more implementations are set forth in the accompanying drawings and the description below. Other features will be apparent from the description and drawings, and from the claims.

A system and/or method for the electrical computation of mathematical operations, substantially as shown in and/or described in connection with at least one of the figures, as set forth more completely in the claims.

BRIEF DESCRIPTION OF THE DRAWINGS

FIG. 1 is a block diagram of an example embodiment of a floating-point multiply-accumulator in accordance with the disclosed subject matter.

Like reference symbols in the various drawings indicate like elements.

DETAILED DESCRIPTION

Figure 2A:
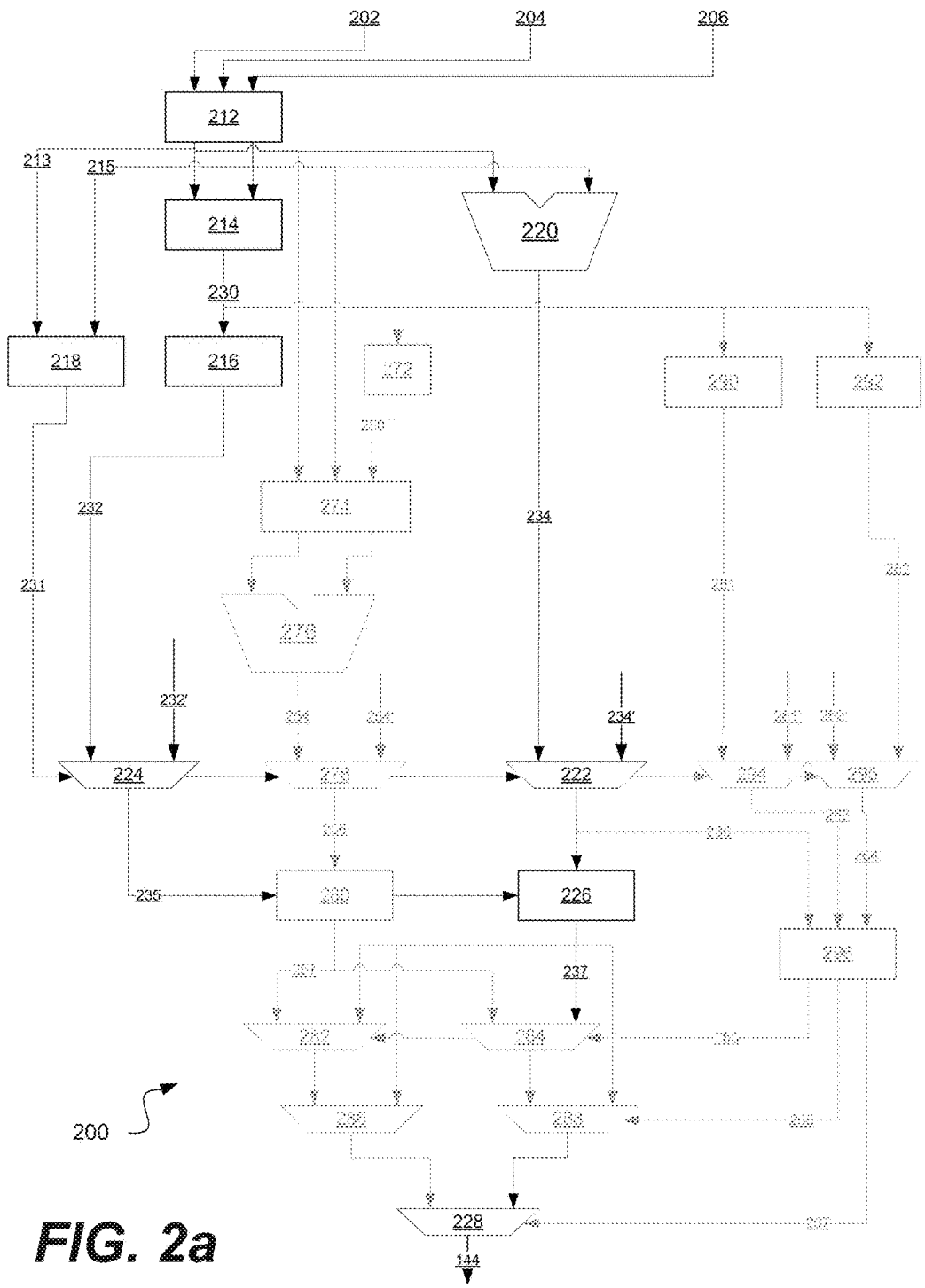
FIG. 2*a* is a block diagram of an example embodiment of a portion of a close path portion of a floating-point multiply-accumulate unit in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is also understood that all blocks, devices, or components described herein may be embodied as electrical circuits, even if the term "circuit" is not expressly used in describing the component. Further it is understood that these circuits may be referred to as modules or as units (e.g., a floating-point unit).

Hereinafter, example embodiments will be explained in detail with reference to the accompanying drawings.

As described above, in computing devices floating point numbers are represented by a set number of bits. This means that floating point numbers may only represent a discrete and constrained part of the infinite number space as bounded by their allocated number of bits. For a normal floating-point number, the number is represented similar to standard scientific notation format, with a whole number in the significand portion of the number and the exponent portion used to indicate where the radix point should be. For example, in a decimal system 23,467 is represented as $2.3467 \times 10^4$, where the single digit of whole number is 2 and the radix point is 4 places to the right. When a number is represented in binary, the most significant bit is always 1. It is understood that the use of scientific notation herein is used due to its relatability to the common reader, and are merely illustrative examples. It is further understood that a preferred disclosed subject matter is focused on binary numbers.

When a floating-point number is small, there are no leading zeros in the significand or fraction portion. Instead, leading zeros are removed by adjusting the exponent portion. So (in decimal) 0.0123 would be written as $1.23 \times 10^{-2}$ and the leading zeros would be removed.

However, according to the IEEE 754 standard, in some cases there are numbers where the floating-point notation would result in an exponent that is too small to be correctly represented. As the computing device is limited to the number of bits used to represent the exponent portion, it is possible for the value needed to indicate the proper amount of radix shift to be larger than the number of bits the computing device has available in the exponent portion of the floating point number. For example, if a floating point includes 8 bits for the exponent, the exponent may be within a range between 127 and −126. That means that if a number has an exponent smaller than −126 (e.g., $2^{-134}$), the normal floating point number scheme would not be able to represent it without the possibility of significant mathematical error. Numbers such as this are referred to as "denormal numbers", "denormalized numbers", or "subnormal numbers", and generally cause difficulties in computing circuits. The IEEE 754 specification provides for techniques to process and represent denormal numbers, which are not necessary to describe herein.

FIG. 1 is a block diagram of an example embodiment of a system or FMAC (floating multiply-accumulate unit) 100 in accordance with the disclosed subject matter. In the illustrated embodiment, a three-path fused multiply-adder, in accordance with U.S. Pat. No. 8,037,118, entitled "Three-path fused multiply-adder circuit" issued on Oct. 11, 2011 is shown. The FMAC 100 receives three inputs 102, 104, and 106. As shown, a three-path fused FMAC 100 splits the data-path (following a multiply array 121) into three paths, namely, an adder anchor path 123, a product anchor path 125, and a close path 124, with each path being designed with different data "anchors". Such partitioning of anchor cases removes the need for a massive aligner component as well as a complementing stage often used in the traditional FMAC. Instead, the design partitions point alignments and correct inversions at local levels. Following a path selection, the activated block processes and prepares the numerical data for a combined add/round unit 122. Combined add/round unit 122 removes the requirement for a massive adder followed by another addition/increment unit for the purpose IEEE-754 rounding. In the illustrated embodiment, a no round path 152 may be taken prior to the add/round unit 122, which ultimately produces the result significand 159.

FIG. 2a is a block diagram of an example embodiment of a portion of close path portion 200 of a floating-point multiply-accumulator or a floating point multiply accumulate (FMAC) unit in accordance with the disclosed subject matter. In various embodiments, the circuit 200 may be included in a floating-point unit (FPU) in a processor or system-on-a-chip (SoC). It is understood that the above are merely a few illustrative examples to which the disclosed subject matter is not limited.

Figure 2B:
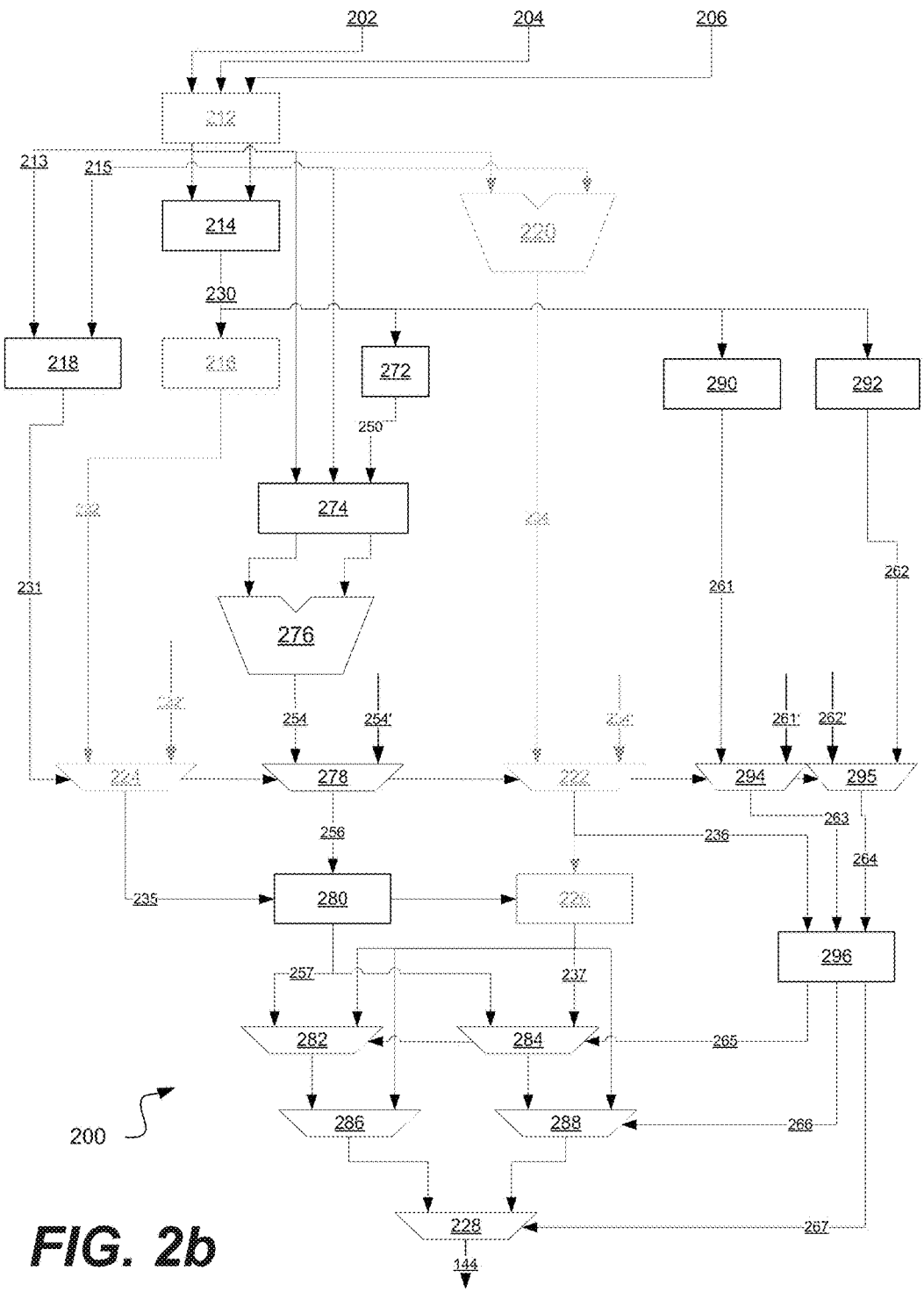
FIG. 2*b* is a block diagram of an example embodiment of a portion of a close path portion of a floating-point multiply-accumulator in accordance with the disclosed subject matter.
Figure 2C:
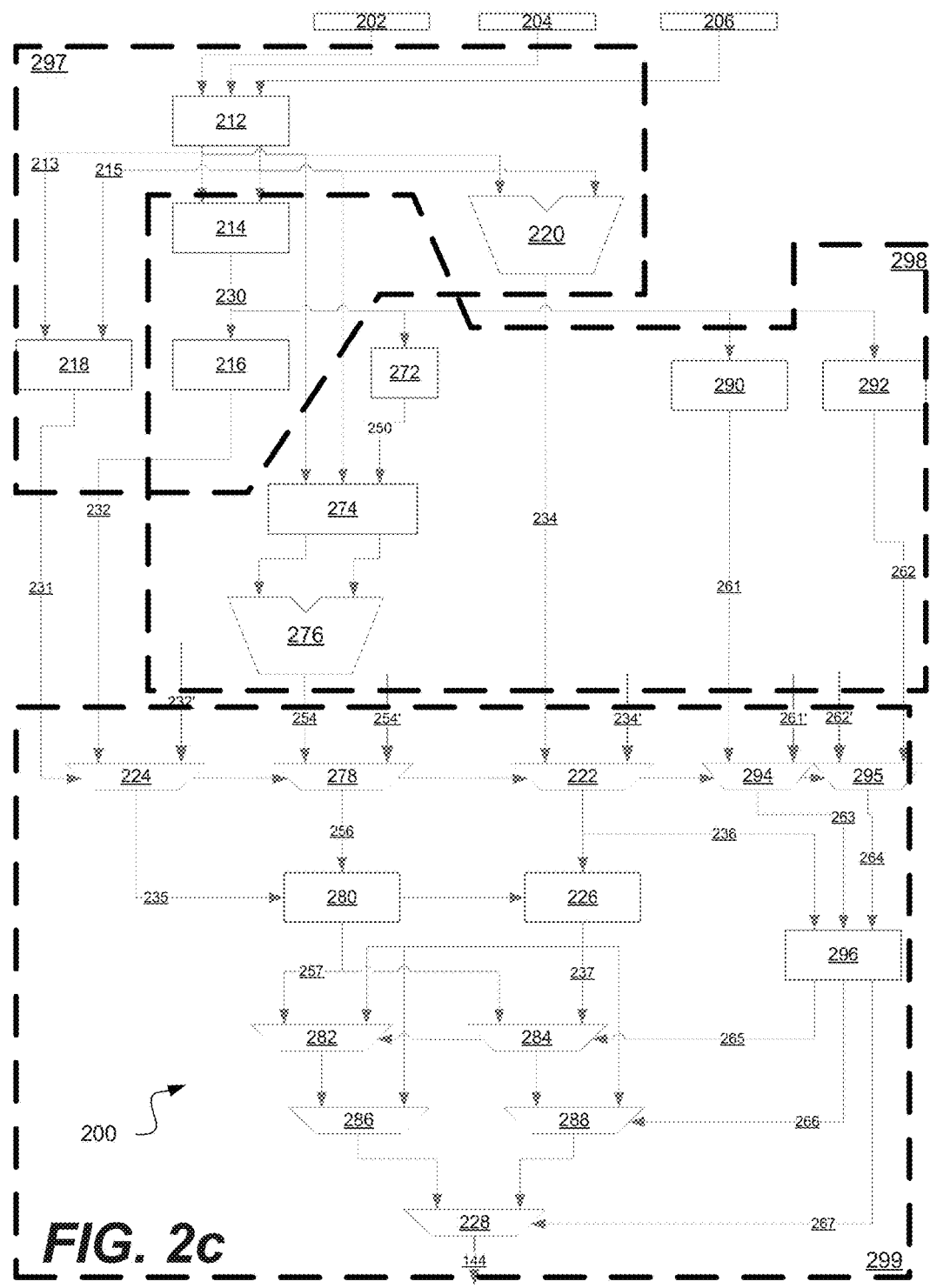
FIG. 2*c* is a block diagram of an example embodiment of a portion of a close path portion of a floating-point multiply-accumulator in accordance with the disclosed subject matter.
Figure 2D:
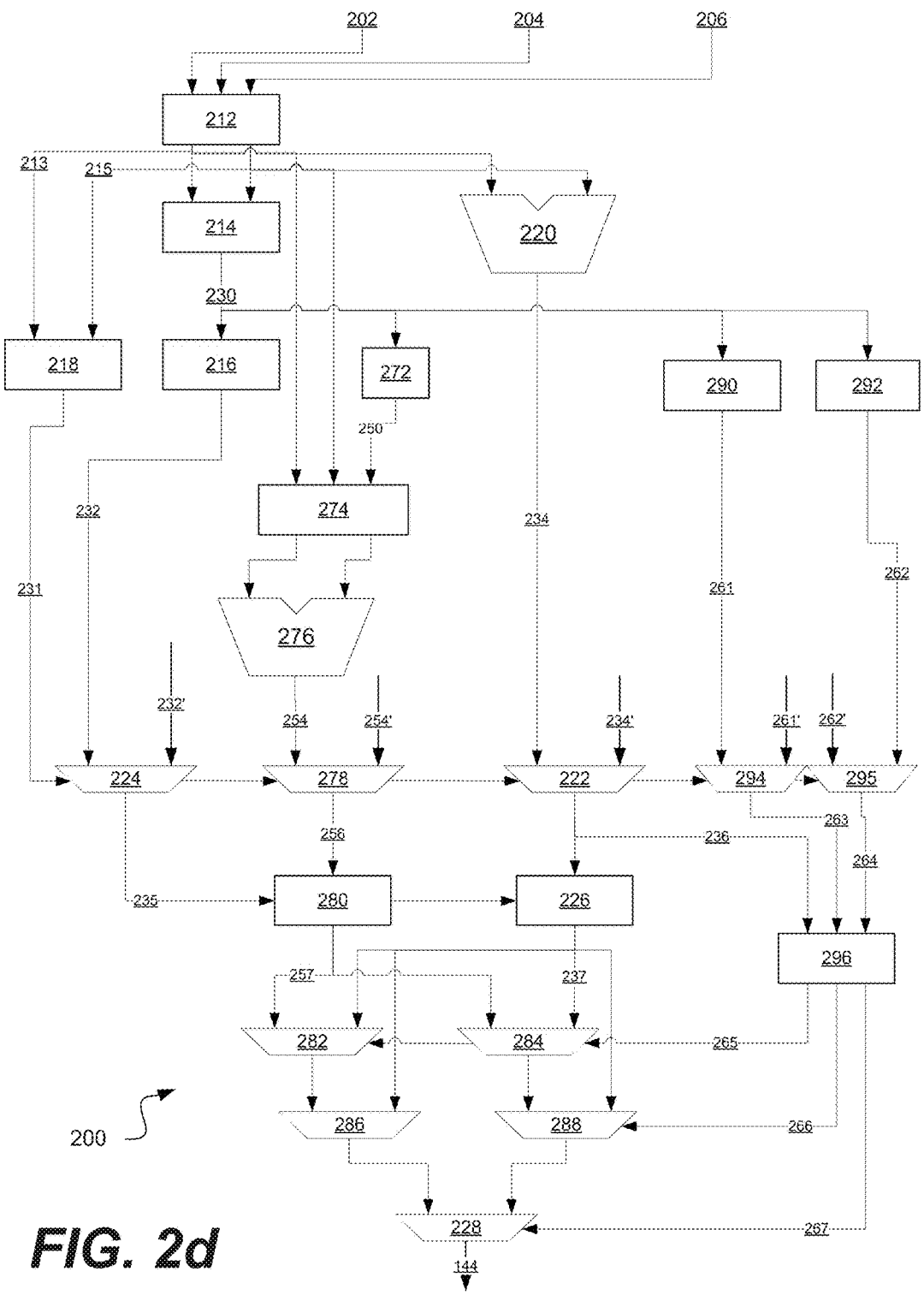
FIG. 2*d* is a block diagram of an example embodiment of a portion of a close path portion of a floating-point multiply-accumulator in accordance with the disclosed subject matter.
Figure 3:
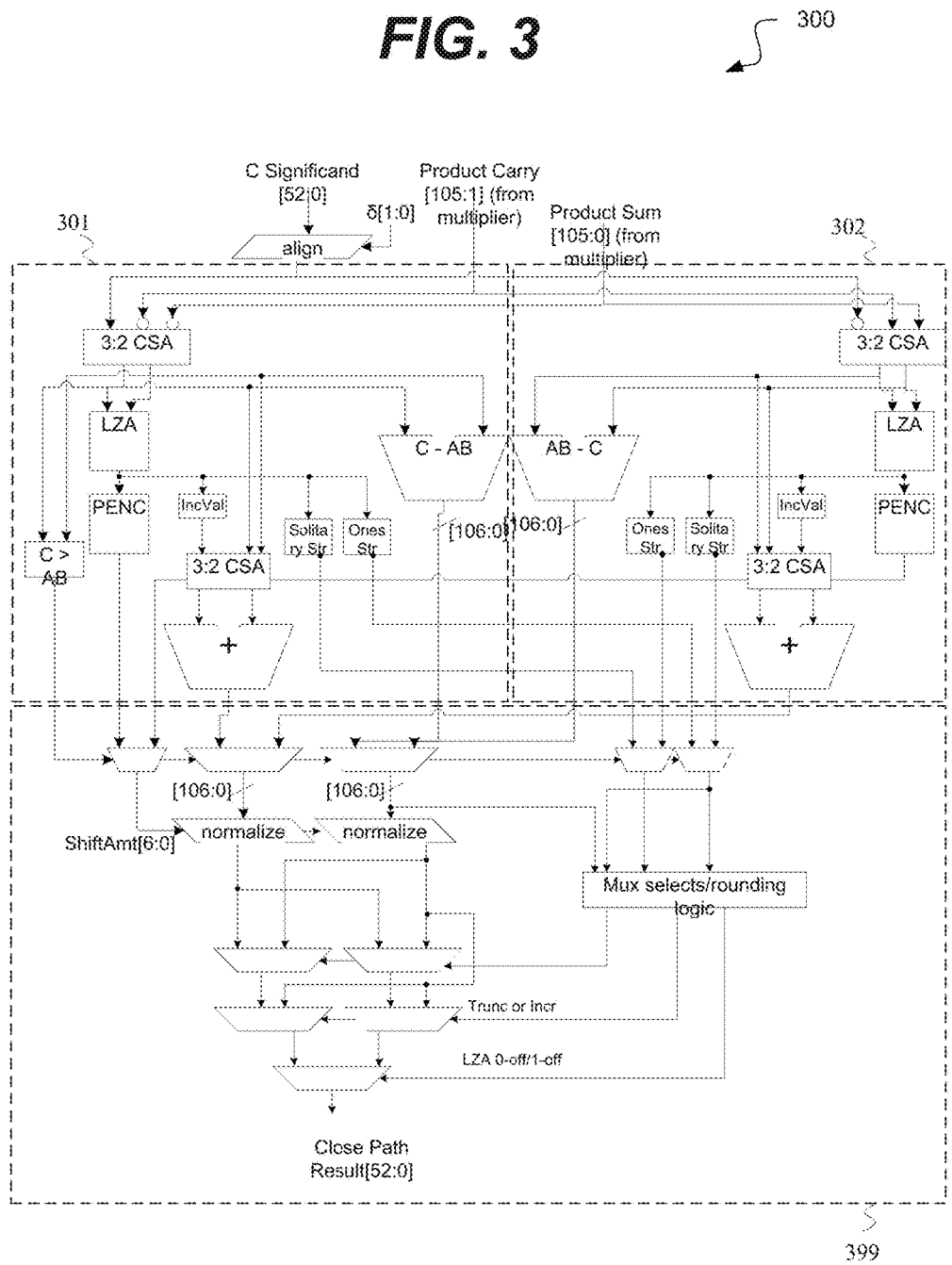
FIG. 3 is a block diagram of an example embodiment of a close path portion of a floating-point multiply-accumulator in accordance with the disclosed subject matter.

One skilled in the art will understand that a close path portion of an FPU usually include two mirrored portions. A first portion subtracts the first floating point operand from the second floating point operand, and the second portion, in parallel, subtracts the second floating point operand from the first floating point operand. At the end of the close path, a MUX (e.g., MUX 222) selects the result that is positive from the two portions and this result is then eventually output as the result of the close path. For illustrative purposes showing both paths would prove very complex. Instead FIGS. 2a, 2b, 2c, and 2d show one of the two paths in sufficient detail to adequately explain and represent the circuitry involved. One skilled in the art will realize that the mirrored path is substantially identical with the placement of the two operands swapped. A full version of the circuit is illustrated in FIG. 3.

In FIG. 2a the non-incremented or unincremented additive portion of the circuit 200 is highlighted. In FIG. 2b the incremented portion of the circuit 200 is highlighted. In FIG. 2c the various general portions of the circuit 200 are highlighted. FIG. 2d shows the circuit 200 without any illustrative highlighting.

As described above, in FIG. 2a the non-incremented or unincremented additive portion of the circuit 200 are described. In the illustrated embodiment, three operands are input into the close path, the significand or addend 202, the product carry 204, and the product sum 206. In various embodiments, the product carry 204 and the product sum 206 are generated by the multiplication of the mantissa portions of the operands 102 and 104 of FIG. 1. In some embodiments, the addend 202 may be aligned (not shown) such that its radix point lines up with that of the product carry 204 and product sum 206. In various embodiments, the addend 202 may include 53-bits, the product carry 204 may include 105-bits, and the product sum 206 may include 106-bits. It is understood that the above are merely a few illustrative examples to which the disclosed subject matter is not limited.

As described above, the operands 202, 204, and 206 may be split into two paths. A first (shown in FIG. 2a) in which the absolute value of addend 202 is greater than or equal to the absolute value of the multiplication of operands 204 and 206. In a second (shown in FIG. 3) in which the absolute value of addend 202 is less than the absolute value of the multiplication of operands 204 and 206.

In the illustrated embodiment, the circuit 200 may include a 3:2 compressor 212. The 3:2 compressor 212 takes as input the operand 202 and the negated versions of the product sum 206 and product carry 204. The 3:2 compressor 212 outputs a result carry 213 and a result sum 215. These outputs 213 and 215 are then sent, in parallel, to four paths. Three paths will be discussed in reference to FIG. 2a, and the fourth will be discussed in reference to FIG. 2b.

In the illustrated embodiment, the result carry 213 and a result sum 215 are input to a comparator 218 to determine which of the two close path portions should ultimately be used. The output 231 of the comparator will ultimately be employed as a selection or control signal in the selection circuits (e.g., MUXs 222 and 224 and so on).

In the illustrated embodiment, the result carry 213 and a result sum 215 are input to a Leading Zero Anticipator 214. The output of the LZA 214 (signal 230) is then input to a Priority Encoder (PENC) 216 to determine the amount of bit shifting needed to normalize the output of the adder 220 (unnormalized sum 234). The shift amount 232 is output from the PENC 216.

In the illustrated embodiment, the result carry 213 and a result sum 215 are also input to an adder 220. The adder 220 produces an unnormalized sum 234. In the illustrated embodiment, the unnormalized sum 234 is the result associated with C-AB. In the mirrored path, the adder (not shown) would compute the result AB-C. The output of that adder is unnormalized sum 234'.

The unnormalized sums 234 and 234' are input to the selection circuit or MUX 222. The MUX 222, based upon the determination made by the comparator 218 (signal 231) selects which of the two paths was correct, and outputs the selected unnormalized sum 236. As described above, this is an unincremented, unnormalized sum or mantissa result 236.

In the illustrated embodiment, a similar selection circuit or MUX 224 selects between the shift amount 232 and its mirrored path counter-part shift amount 232'. Again, the comparator 218 output 231 is used to make the selection. The selected shift amount 235 is produced.

The unincremented, unnormalized sum or mantissa result 236 is input to a bit shifter or unincremented bit shifter 226. Based upon the selected shift amount 235, the bit shifter 226 may shift or normalize the bits of unincremented, unnormalized sum or mantissa result 236. The unincremented bit shifter 226 may output an unincremented, normalized sum or mantissa result 237.

Traditionally, this unincremented, normalized sum or mantissa result 237 may have been the only normalized sum or mantissa result 237 output by the FPU. The value of the result 237 may then have been incremented or not, depending upon the rounding determination. This adjustment determination and incrementing would have occurred after the normalized sum or mantissa result 237 would have been determined and additional processing time would have been required. In the illustrated embodiment, an incremented normalized sum or mantissa result 257 is produced in parallel with the unincremented, normalized sum or mantissa result 237.

In FIG. 2b the incremented additive portion of the circuit 200 is described. In the illustrated embodiment, the output 230 of the LZA 214 is input to increment value circuit 272. The increment value circuit 272 may shift the result 230 of the LZA 214 by the mantissa width. This may result in an approximation of the rounding point and is output as signal 250.

In the illustrated embodiment, the result sum 215, the result carry 213, and the shifted LZA output 250 may be feed into another 3:2 compressor 274. The output of the 3:2 compressor 274 may be input into the adder 276. In such an embodiment, the adder 276 may compute an incremented, unnormalized (pseudo-)sum or mantissa result 254. In the mirrored path, the adder (which is not shown but would be numbered 276') would compute the incremented result of the result sum 215 minus the result carry 213, or, in the parlance of the art, AB-C+1. The output of that adder is incremented unnormalized sum 254'.

The unnormalized incremented sums 254 and 254' are input to the selection circuit or MUX 278. The MUX 278, based upon the determination made by the comparator 218 (signal 231) selects which of the two paths was correct, and outputs the selected unnormalized incremented sum 256. As described above, this is an incremented, unnormalized sum or mantissa result 256.

The selected incremented, unnormalized sum or mantissa result 256 is input to a bit shifter or incremented bit shifter 280. Based upon the selected shift amount 235, the bit shifter 280 may shift or normalize the bits of incremented, unnormalized sum or mantissa result 256. The incremented bit shifter 280 may output an incremented, normalized sum or mantissa result 257.

In the illustrated embodiment, in parallel to the computation of the incremented unnormalized sum 254, the circuit 200 may compute two strings or masks 261 and 262. These two masks 261 and 262 will be employed to solve the following issues.

In various embodiments, the LZA 214 may not be as accurate as desired. Specifically, it may generate two, instead of one, possible locations for the leading one of the result sum 213. In such an embodiment, the LZA output 230 may include garbage bits past the indicated leading one position. These garbage bits may corrupt the result of the increment computation.

In addition, the circuit 200 computes the sticky bit in parallel with the computations o the sums. This is preferable because the rounding point of the unnormalized sums is not known until late in the process. Because it is unknown at the beginning, the starting point of the traditional OR-reduction or OR-tree is also unknown.

In the illustrated embodiment, the problem of the LZA garbage bits is handled by actually allowing the LZA garage bits to participate in the production of the incremented value 254. The reason that this can be made to work is because the maximal error that is introduced by these garbage bits is (an additional) 1 unit-in-last-place or unit-of-least-precision (ulp) at the rounding point. Therefore, the unnormalized incremented sum 254 that is produced will either be the +1 ulp value (the desired value) or a +2 ulp value (relative to the unnormalized unincremented sum 234).

In such an embodiment, to then generate the desired unnormalized incremented value, the circuit determines that it has the +2 ulp value instead of the +1 ulp value. If so, the circuit 200 constructs the +1 ulp value.

In the illustrated embodiment, detection of the +2 ulp case may be done by comparing the least significant bits (LSBs) of the unincremented unnormalized sum 236 and unnormalized incremented sum 256. If the LSBs are the same, the +2 ulp value has been produced. Otherwise, the +1 ulp value has been generated. Constructing the correct +1 ulp value can then be done from the +2 ulp value and the unincremented unnormalized sum 236.

To do this the circuit 200 needs to identify the position of the respective LSBs. As described above, in the illustrated embodiment, in parallel to the computation of the incremented unnormalized sum 254, the circuit 200 may compute two strings or masks 261 (allOnesStr) and 262 (solitaryOneStr). These masks 261 and 262 are respectively produced by circuits 290 and 292.

To compute the masks 290 and 292, the LZA output 230 is defined as having three sub-fields or portions. The first sub-field is defined as the bits from most significant bit (MSB) to the bit after the predicted position (p) of the leading one in the sum of the product sum 204 and the product carry 206. The bits of the first sub-filed have a value of 0. The second sub-field is the bit p and has a value of 1. The third sub-field includes the $0^{th}$ bit to the bit before the bit-p, and has arbitrary bit values. Stated in a more concise form:

sub-field 1: LZA[MSB:p+1]=0
sub-field 2: LZA[p]=1
sub-field 3: LZA[p−1:0] has arbitrary bit values.

When p=0, sub-field 3 doesn't exist. When p=MSB, sub-field 1 doesn't exist.

Based upon these definitions the masks 261 and 262 may be produced. The masks 261 and 262 may have the same bit-width as the LZA output 230. The value of the first and second sub-fields may be the same (1 and 0 respectively). However, for the first mask or allOneStr 261 the third sub-field of bits may be set to 1. For the second mask or solitaryOneStr 262 the third sub-field of bits may be set to 0. In the illustrated embodiment, these masks 261 and 262 can computed in parallel with the computation of the pseudo-incremented sum 254, since they are computed from the LZA 214.

In the illustrated embodiment, a selection circuit or MUXs 294 and 295 may select between the masks 261 and 262, and their mirrored counterparts 261' and 262'. Again the MUXs 294 and 295 may be controlled by the signal 231. The MUXs 294 and 295 may produce the selected masks 263 and 264, respectively.

These masks 263 and 264 can now be used to determine the value of the LSB and round bits, as well as to compute the value of the sticky bit. In various embodiments, the LSB may be calculated by masking the unincremented, unnormalized sum 236 against the second mask (solitaryOneStr) 264. The Round bit may be calculated by masking the unincremented, unnormalized sum 236 against a 1-bit shifted version of the second mask (solitaryOneStr) 264. The Sticky bit may be calculated by masking the unincremented, unnormalized sum 236 against the first mask (allOnesStr) 263.

In the illustrated embodiment, the selection circuits or MUXs 282 and 284 may select between the incremented normalized sum or mantissa result 257 and the unincremented, normalized sum or mantissa result 237. This is based upon the signal 265, output by the MUX select & rounding computation logic circuit 296.

In the illustrated embodiment, the MUXs 286 and 288 may select between a truncated or incremented sum. This is based upon the signal 266, output by the MUX select & rounding computation logic circuit 296. As stated earlier, because of the garbage bits at the bottom of the LZA, the circuit 200 may produce, for the incremented value, a +1 ulp version or a +2 ulp version. MUXs 282/284 may be configured to produce the correct incremented (+1 ulp) value from the initially produced value.

Finally, the selection circuit or MUX 228 selects between the LZA 0-off and 1-off cases (the incremented and unincremented paths) and making a late decision between the two. This is based upon the signal 267, output by the MUX select & rounding computation logic circuit 296. The MUX 228 outputs the close path result 144, as described above.

In FIG. 2c the various general portions of the circuit 200 are highlighted. The circuit 200 includes the unincremented mantissa addition circuit 297 configured to compute an unincremented mantissa result. The circuit 200 includes the incremented mantissa addition circuit 298 configured to, at least partially in parallel with the mantissa addition circuit 297, produce an incremented mantissa result. The circuit 200 includes the selection circuit 299 configured to produce a close path result 144 by selecting between the unincremented mantissa result 234 and the incremented mantissa result 254. In various embodiments, the LZA 214 and/or the PENC 216 may be included by both the unincremented mantissa addition circuit 297 and the incremented mantissa addition circuit 298.

FIG. 2d shows the circuit 200 without any illustrative highlighting.

FIG. 3 is a block diagram of an example embodiment of a close path portion 300 of a floating-point multiply-accumulate unit in accordance with the disclosed subject matter. As described above, the close path circuit 300 includes a first portion 301 that computes the C-AB sum (in both incremented and unincremented form), which is shown in FIGS. 2a, 2b, 2c, and 2d (with the addition of the un-mirrored element comparator 218 of FIGS. 2a, 2b, 2c, and 2d). The close path circuit 300 also includes the mirrored path or second portion 302 that computes the AB-C sum (in both incremented and unincremented form). Further, the close path circuit 300 includes the selection circuit 399.

Figure 4:
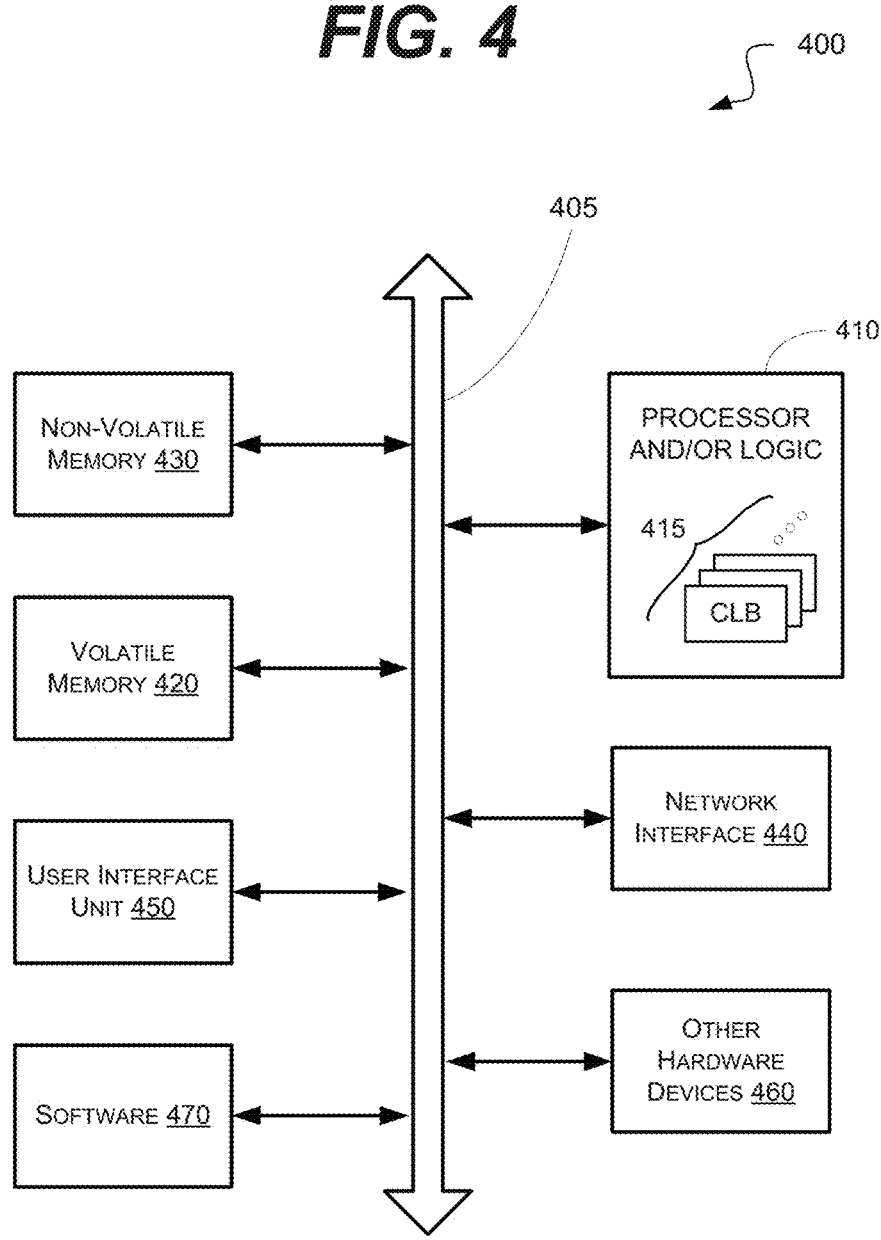
FIG. 4 is a schematic block diagram of an information processing system, which may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM), etc.). The information processing system 400 according to the disclosed subject matter may further include a non-volatile memory 430 (e.g., a hard drive, an optical memory, a NAND or Flash memory, etc.). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced, Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 400 according to the disclosed subject matter may further include a user interface unit 450 (e.g., a display adapter, a haptic interface, a human interface device, etc.). In various embodiments, this user interface unit 450 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor, etc.). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440, etc.) of the information processing system 400. In such an embodiment, the information processing system 400 may include one or more native applications, which may be installed locally (e.g., within the non-volatile memory 430, etc.) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
 a floating-point multiply-accumulate unit configured to generate a floating point result by either adding or subtracting three floating point operands: an addend, a product carry, and a product sum; and comprising:
 a close path adder comprising:
  an unincremented mantissa addition circuit configured to compute an unincremented mantissa result based upon the three floating point operands;
  an incremented mantissa addition circuit configured to, at least partially in parallel with the unincremented mantissa addition circuit, produce an incremented mantissa result; and
  a selection circuit configured to produce a close path result by selecting between the unincremented mantissa result and the incremented mantissa result.

2. The apparatus of claim 1, wherein the incremented mantissa addition circuit is configured to, in parallel with the unincremented mantissa addition circuit, produce an incremented mantissa result even though an incrementing point of the unincremented mantissa result is not known when the incremented mantissa addition circuit produces the incremented mantissa result.

3. The apparatus of claim 1, wherein the close path adder comprises:
 a compressor to produce, based upon the addend, the product carry and the product sum, a result carry and a result sum.

4. The apparatus of claim 3, wherein the incremented mantissa addition circuit comprises:
 a leading zero anticipator to compute an increment amount; and
 an adder to add the result carry, the result sum, and the increment amount to produce an unnormalized incremented mantissa result.

5. The apparatus of claim 1, wherein the incremented mantissa addition circuit comprises:
a leading zero anticipator configured to compute a first least-significant-bit (LSB) mask and a second least-significant-bit (LSB) mask.

6. The apparatus of claim 5, wherein the incremented mantissa addition circuit comprises a rounding circuit configured to:
compute an LSB and a rounding bit based, at least in part, upon the first LSB mask, and
compute a sticky bit based, at least in part, upon the second LSB mask.

7. The apparatus of claim 5, wherein the leading zero anticipator is configured to compute the first LSB mask and the second LSB mask, in parallel with the production of the incremented mantissa result.

8. The apparatus of claim 1, wherein the selection circuit comprises:
a normalizer circuit to normalize an unnormalized incremented mantissa result and an unnormalized unincremented mantissa result; and
a sum selection circuit to select between the incremented mantissa result and the unincremented mantissa result.

9. A system comprising:
a memory configured to store floating point operands; and
a processor comprising
a floating-point multiply-accumulate unit configured to generate a floating point result by either adding or subtracting three floating point operands: an addend, a product carry, and a product sum; and comprising:
a close path adder comprising:
an unincremented mantissa addition circuit configured to compute an unincremented mantissa result based upon the three floating point operands;
an incremented mantissa addition circuit configured to, at least partially in parallel with the unincremented mantissa addition circuit, produce an incremented mantissa result; and
a selection circuit configured to produce a close path result by selecting between the unincremented mantissa result and the incremented mantissa result.

10. The system of claim 9, wherein the incremented mantissa addition circuit is configured to, in parallel with the unincremented mantissa addition circuit, produce an incremented mantissa result even though an incrementing point of the unincremented mantissa result is not known when the incremented mantissa addition circuit produces the incremented mantissa result.

11. The system of claim 9, wherein the close path adder comprises:
a compressor to produce, based upon the addend, the product carry and the product sum, a result carry and a result sum.

12. The system of claim 11, wherein the incremented mantissa addition circuit comprises:
a leading zero anticipator to compute an increment amount; and
an adder to add the result carry, the result sum, and the increment amount to produce an unnormalized incremented mantissa result.

13. The system of claim 9, wherein the incremented mantissa addition circuit comprises:
a leading zero anticipator configured to compute a first least-significant-bit (LSB) mask and a second least-significant-bit (LSB) mask.

14. The system of claim 13, wherein the incremented mantissa addition circuit comprises a rounding circuit configured to:
compute an LSB and a rounding bit based, at least in part, upon the first LSB mask, and
compute a sticky bit based, at least in part, upon the second LSB mask.

15. The system of claim 13, wherein the leading zero anticipator is configured to compute the first LSB mask and the second LSB mask, in parallel with the production of the incremented mantissa result.

16. The system of claim 9, wherein the selection circuit comprises:
a normalizer circuit to normalize an unnormalized incremented mantissa result and an unnormalized unincremented mantissa result; and
a sum selection circuit to select between the incremented mantissa result and the unincremented mantissa result.

17. A method comprising:
receiving three floating point operands: an addend, a product carry, and a product sum;
computing, via an unincremented mantissa addition circuit, an unincremented mantissa result based upon the three floating point operands;
computing, by an incremented mantissa addition circuit and at least partially in parallel with the unincremented mantissa addition circuit, an incremented mantissa result; and
producing a close path result by selecting between the unincremented mantissa result and the incremented mantissa result.

18. The method of claim 17, wherein computing an incremented mantissa result comprises:
generating, based upon the addend, the product carry and the product sum, a result carry and a result sum; and
computing the incremented mantissa result based, at least in part upon, the result carry, the result sum, and an output of a leading zero anticipator.

19. The method of claim 17, wherein computing an incremented mantissa result comprises:
computing compute a first least-significant-bit (LSB) mask and a second least-significant-bit LSB) mask; and
computing an LSB and a rounding bit based, at least in part, upon the first LSB mask, and computing a sticky bit based, at least in part, upon the second LSB mask.

20. The method of claim 19, wherein computing an incremented mantissa result comprises:
computing the first LSB mask and the second LSB mask, in parallel with the production of the incremented mantissa result.

* * * * *